(No Model.)　　　H. SOMMERFELD.　　4 Sheets—Sheet 2.
COMBINED PLOW AND SEEDER.
No. 487,871.　　　　　　　　Patented Dec. 13, 1892.
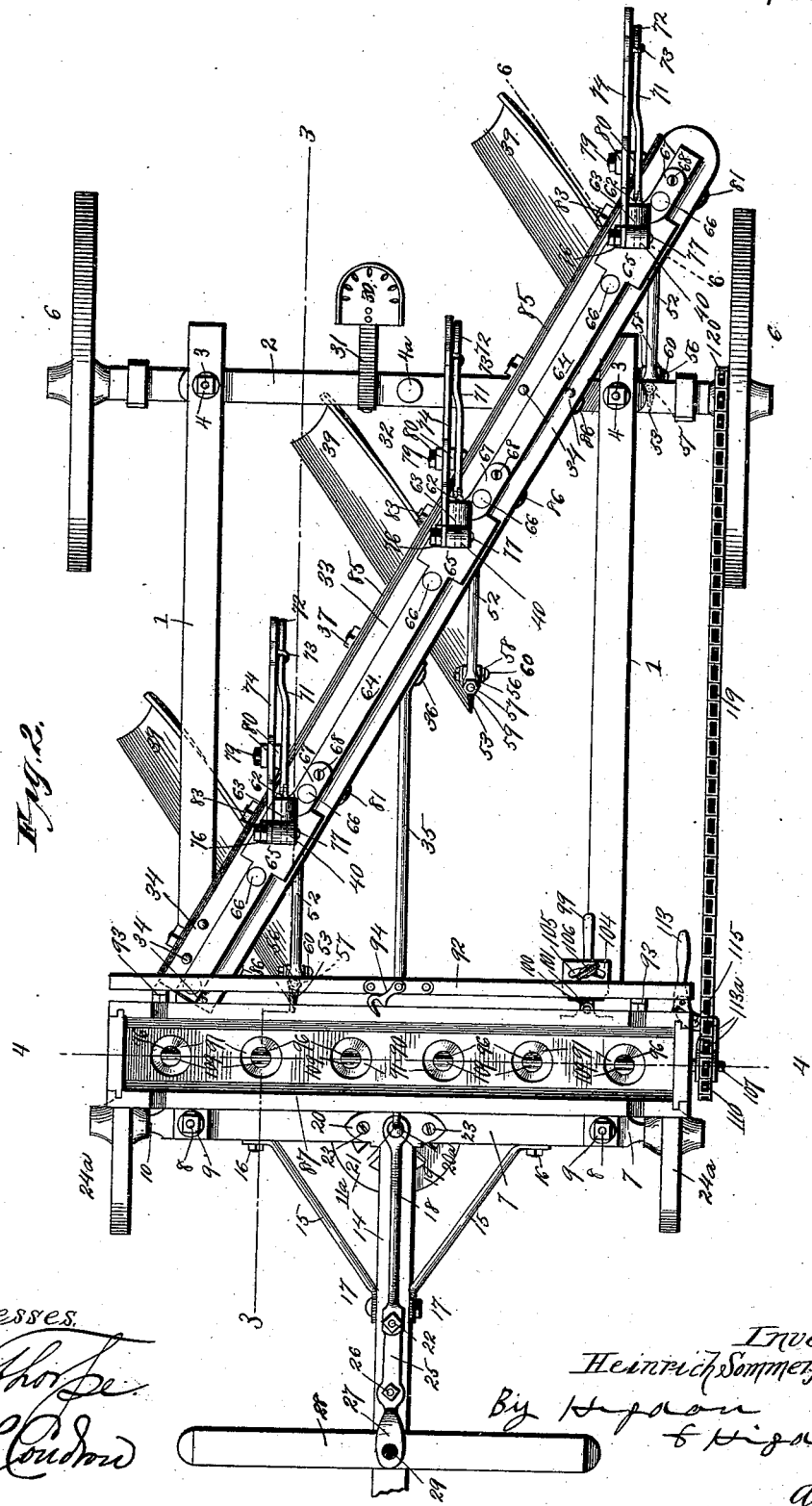

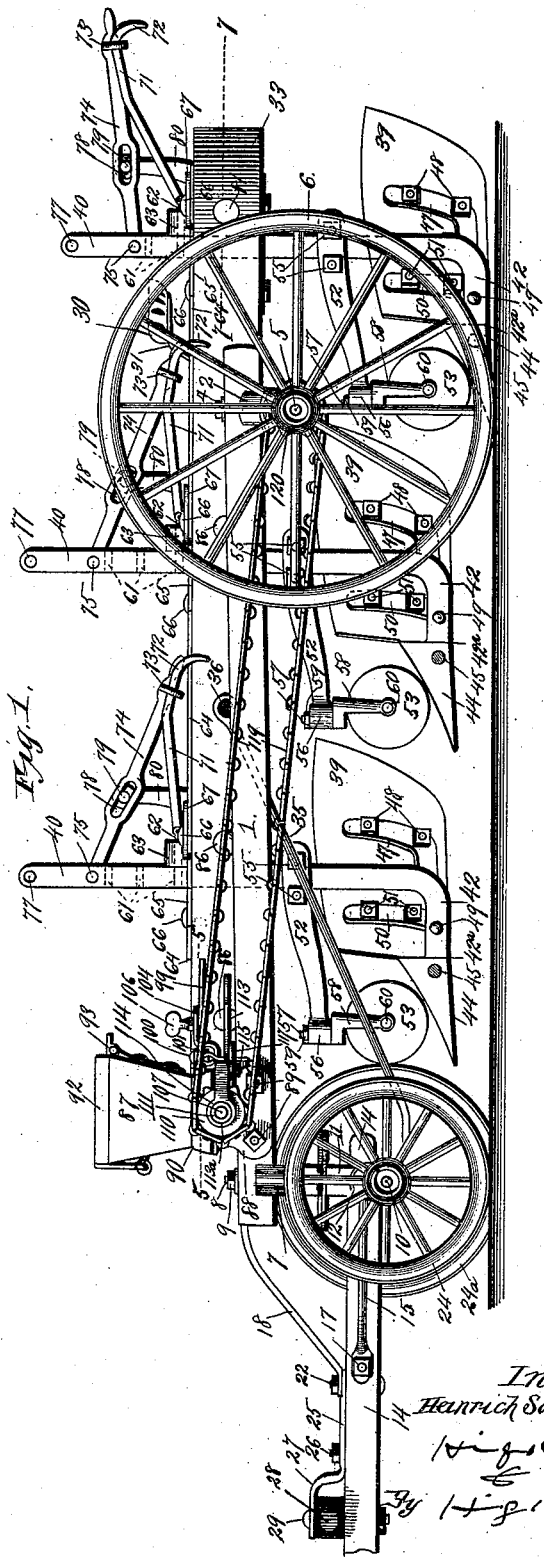

(No Model.) H. SOMMERFELD. 4 Sheets—Sheet 3.
COMBINED PLOW AND SEEDER.
No. 487,871. Patented Dec. 13, 1892.
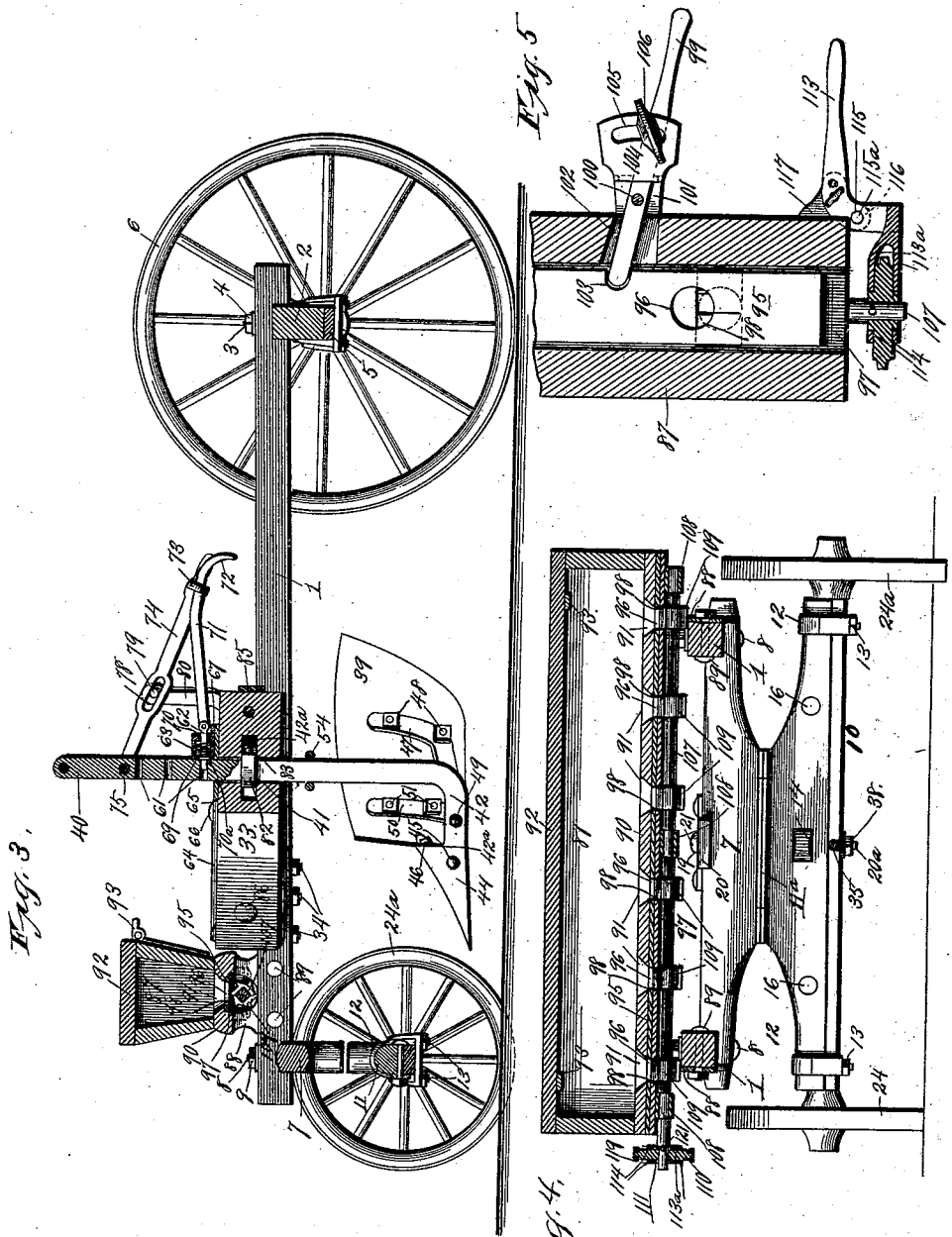
Witnesses:
Inventor,
Heinrich Sommerfeld,
By Attys.

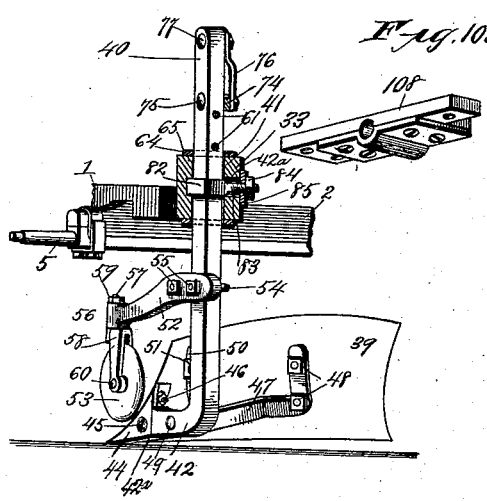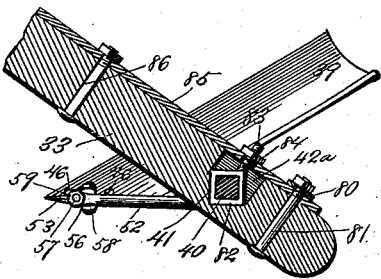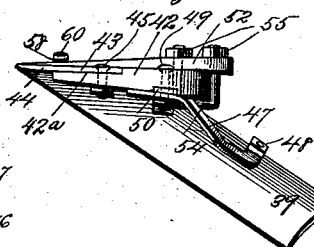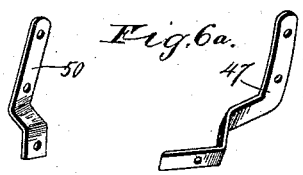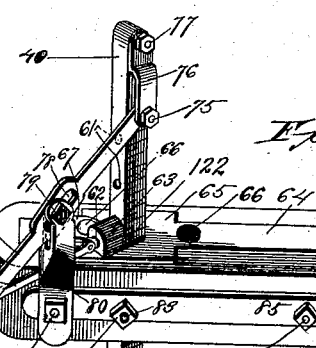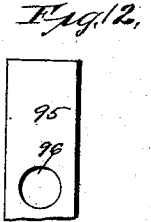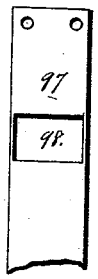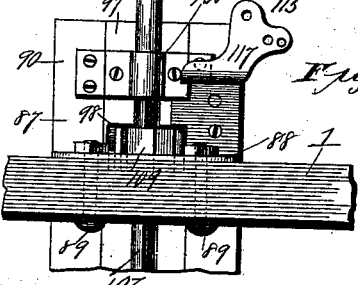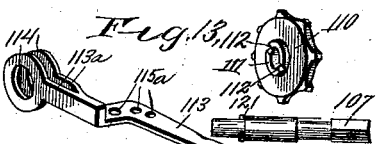

UNITED STATES PATENT OFFICE.

HEINRICH SOMMERFELD, OF CANTON, ASSIGNOR OF ONE-HALF TO S. F. SACKET, OF MARION, KANSAS.

COMBINED PLOW AND SEEDER.

SPECIFICATION forming part of Letters Patent No. 487,871, dated December 13, 1892.

Application filed March 21, 1892. Serial No. 425,681. (No model.)

*To all whom it may concern:*

Be it known that I, HEINRICH SOMMERFELD, of Canton, McPherson county, Kansas, have invented certain new and useful Improvements in a Combined Plow and Seeder, of which the following is a full, clear, and exact description, reference being had to the accompanying drawings, forming a part hereof.

My invention relates to that class of agricultural implements in which a number of plowshares are stocked upon a frame for the purpose of opening a number of furrows simultaneously at each traverse of the implement, and also to mechanism for sowing seed in advance of the plowshares, so that as the plow advances the seed shall be covered by the plowshares.

The objects of my invention are to produce a combined gang-plow and seeder which shall be simple, strong, durable, and inexpensive in construction, and of light draft, and the several operative parts of which shall be under complete control of the attendant or driver.

A further object of my invention is to produce a combined gang-plow and seeder the plows of which shall be capable of easy adjustment vertically, so as to cut precisely the desired depth of furrow. Furthermore, to produce a combined gang-plow and seeder the seeding mechanism of which shall be capable of being thrown quickly into and out of operation and the quantity of seed fed from which can be easily and accurately regulated according to the requirements of the work.

A still further object of my invention is to produce a plowshare of such form as to most effectively turn the furrow-slice and at the same time most effectively cover the seed.

To the above purposes my invention consists in certain peculiar and novel features of construction and arrangement, as hereinafter described and claimed.

In order that my invention may be fully understood, I will proceed to describe it with reference to the accompanying drawings, in which—

Figure 1 is a side elevation of a combined gang-plow and seeder embodying my invention. Fig. 2 is a plan view of the same. Fig. 3 is a vertical longitudinal section of the same on the line 3 3 of Fig. 2. Fig. 4 is a transverse vertical section of the same on the line 4 4 of Fig. 2. Fig. 5 is a horizontal section of the same on the line 5 5 of Fig. 1. Fig. 6 is a transverse vertical section of the same on the line 6 6 of Fig. 2. Fig. 6$^a$ comprises detached perspective views of the two brackets for attaching the plowshares to the lower ends of the adjustable standards. Fig. 7 is a horizontal section of the machine on the line 7 7 of Fig. 1. Fig. 8 is an under side plan view of the parts shown in Fig. 7, the oblique beam of the machine-frame being omitted. Fig. 9 is a perspective view of one end of the oblique beam and one of the plowshare-standards and its retaining connection. Fig. 10 is an under side plan view of one end of the seed-hopper and its adjacent supporting and operative connections. Fig. 10$^a$ is a detached perspective view of one of the bearings for the feed-shaft of the seeding mechanism. Fig. 10$^b$ is a detached perspective view of one of the brackets for supporting the seed-hopper. Fig. 11 is a detached plan view of one end of the bottom plate of the seed-hopper. Fig. 12 is a detached plan view of one end of the seeding-slide. Fig. 13 comprises detached perspective views of one end of the feed-shaft, the sprocket-wheel for rotating the feed-shaft for the seed-hopper, and of the lever for moving said wheel into and out of action.

In the said drawings, 1 designates two horizontal side beams, which extend longitudinally at opposite sides of the machine and which constitute the sides of the frame of the same, the said beams being preferably of wood, but permissibly of metal, if preferred. At its rear end each of these side beams 1 rests upon one of the end portions of the rear axle-bolster 2, and is secured thereto by bolts 3 passed vertically through the beams and bolster and which are held in position by retaining-nuts 4, which are screwed, preferably, upon the upper ends of the bolts. The bolster 2 is suitably secured to the upper side of the rear carrying-axle 5 of the machine by bolts 4$^a$ or equivalent means, suitable carrying-wheels 6 being mounted upon the ends of said axle and supporting the rear end of the machine-frame. The front ends of the side beams 1 rest upon the end portions of the front axle-bolster 7, the said beams being secured to the bolster by bolts 8, passed vertically through the beams and bolster and held in position by retaining-nuts 9, which are screwed, preferably, upon the upper ends of the bolts. This bolster 7 is mounted directly above a lower bolster-beam 11, which is secured to the upper side of the front carrying-axle 10 of the machine, a suitable fifth-wheel 11ª being interposed between the upper side of the lower bolster-beam 11 and the lower side of the bolster 7 in the usual or any preferred manner. Suitable clips 12 are employed for securing the lower bolster-beam 11 upon the axle 10, each of said clips embracing one end of the bolster-beam 11 and passing beneath the corresponding end of the axle 10 and said clips being retained in position by nuts 13, as shown.

14 designates the tongue of the machine, the rear end of said tongue being inserted transversely through the middle of the lower bolster-beam 11. This tongue is braced against lateral strain by two tongue-hounds 15, the rear ends of which are bolted, as at 16, to the front side of the bolster-beam 11, and the front ends of which are bolted, as at 17, to opposite sides of the tongue. The tongue 14 is further braced or supported from above by a bar 18, the front end of which is bolted, as at 22, or otherwise secured to the upper side of the rear part of the tongue and which extends obliquely upward and rearward from said tongue. The rear upper end of this bar 18 is formed with an eye 19, which engages a hook 21, which hook is formed upon the upper end of the king-bolt 20ª. The king-bolt passes, also, through a wear-plate 20, said plate being secured by screws 23 or equivalent means to the upper side of the bolster 7 at the middle thereof. Upon the ends or spindles of the front axle 10 are mounted the two front carrying-wheels 24 and 24ª, these wheels being of the usual or any preferred construction and the only peculiarity of said wheels being that the right-hand or "off" wheel is of greater diameter than the left-hand or "near" wheel, so as to permit the right-hand wheel to run in one of the furrows previously opened by the plow, the front axle 10 at the same time remaining horizontal.

28 designates the doubletree to which the draft-animals are to be harnessed, the said doubletree being connected to the tongue 14 by a vertical bolt 29, which also passes through the front end 27 of a link-bar 25, the said bar being attached in turn at its rear end to the upper side of the tongue by the bolt 22, above referred to, and at its front end by a similar bolt 26.

30 designates the driver's seat, which is secured to the upper end of an upwardly and rearwardly curved standard 31, the lower end of said standard being bolted or otherwise suitably secured to the upper side of the rear bolster 2 of the machine, preferably midway of the length of said bolster.

33 designates a horizontal beam, preferably of wood, which extends obliquely from the front right-hand corner of the frame of the machine to the rear left-hand corner of the same, the said oblique beam being bolted at its ends, as at 34, or secured in other suitable or preferred manner to the upper side of the left-hand side beam 1 of the machine-frame, near the front end thereof, and also to the rear bolster 2, near the right-hand end thereof. This oblique bar 33 is also braced against the lateral strain resulting from the draft upon the plowshares by a brace-rod 35, the rear end of which is connected to the front side of the bar by a horizontal through-bolt 36 and its retaining-nut 37, the front end of said rod being connected to the lower end of the king-bolt so as to lie beneath the middle of the front axle 10, and being secured in such position by a nut 38, which is screwed upon the lower end of the king-bolt. This oblique bar 33 serves as the support for the plowshares 39, the manner of connecting said plowshares to the oblique beam being as follows: 40 designates a number of vertical standards, which are preferably of wood and each of which is preferably of rectangular form in cross-section. Each of these standards 40 passes downward through an opening 41 in the oblique bar or beam 33, each of said openings communicating with a lateral opening or recess 42ª, which is formed in the bar 33 for a purpose to be hereinafter explained. The lower end 42 of each of these standards 40 extends forward a short distance, and on one side the extremity of said portion 42 is formed with a recess 42ª, to receive the rear extension 43 of the plow-point 44, the said extension 43 being secured to the portion 41 by a through-bolt 45, and said point 44 is secured to the front of the plowshare by a through-bolt 46. The body portion of each of the plowshares 39 is elongated, so as to extend obliquely outward and rearward, as shown, and each of said shares is connected to the lower part of each standard 42 by two braces 47 and 50. The middle portion of the brace 47 is of approximately-V form, and its outer end extends upward against the rear side of the corresponding plowshare and is secured thereto by suitable bolts 48 and their retaining-nuts. The inner ends of each of the brackets 39 is bent horizontally forward against the corresponding side of the lower portion 42 of the adjacent standard 40 and is secured to said portion 42 by a bolt 49. Each bracket 50 is located immediately in front of the corresponding bracket 47, and one end of each bracket 50 extends upward against the rear side of the corresponding plowshare 39, said end of the bracket being secured to the plowshare by two bolts 51 and their retaining-nuts. The opposite end of each of the brackets 50 extends downward, so as to lie against the adjacent side of the lower portion 42 of the corresponding standard 40, said lower portion 42 being recessed for this purpose, and the bolt 49 extending through the inner end of the bracket 50 and the inner end of the bracket 47. It is to be observed that each plowshare or mold-board 39 is of elongated rectangular form in front or rear elevation, so as to extend obliquely laterally and rearwardly, as shown, the mold-boards being concave on their front faces and convex on their rear faces, and the described form and position of the mold-boards being such as to impart the most effective furrow-cutting and slice-turning action to the plowshares.

52 designates the bracket-arms which support the disk or rolling colters 53 of the plows, each of said bracket-arms being secured to one of the standards 40, above the corresponding plowshares 39, by means of a U-shaped clip 54. Each of these clips 54 embraces three sides of the corresponding standard 40, while the rear end of the bracket 52 extends against the fourth side of said standard, the ends of each clip extending transversely through the end of the bracket and the parts being retained by suitable nuts 55, as shown. Thus it will be seen that the supports 52 extend forward from the standards 40 in approximately-horizontal planes, and that by loosening the nuts 55 the supports can be set higher up or lower down upon the standards, as desired. At its outer end each support 52 is formed with a vertical bearing 56, through which extends a vertical stud 57, which is carried by the upper end of the fork 58 of the corresponding colter 53, the said stud being retained in its position within the corresponding bearing 56 by a nut 59, as shown. Each colter 53 is embraced by the arms of the corresponding fork 58, and the axle 60 of said colter extends transversely through the lower ends of said fork-arms. The arrangement is such that each colter travels in front of the edge of each plowshare 39 and in direct alignment with said edge and opens the ground for the corresponding plowshare as the machine is drawn along by the draft-animals.

In order to provide for the vertical adjustment of the standards 40 in the oblique bar 33, necessary to regulate the depth of cut of the plowshares 39, I have provided the standards 40 with the following attachments: 61 designates a number of horizontal holes or recesses, which are formed transversely through the upper part of each standard 40, the said holes or recesses being arranged in vertical series, as shown, and one or another of said holes or recesses is engaged by a horizontal sliding pin or bolt 62, the said pins thus retaining the standards 40 in any desired position of vertical adjustment. Each of the pins 62 works horizontally through a guide 63, which is secured to the corresponding one of a number of rectangular enlargements 65 of a bearing-plate 64, the said bearing-plate being composed of alternate narrow portions and the enlarged portions just described and extending longitudinally of the upper side of the oblique beam 33. This bearing-plate 64 is secured to the oblique beam 33 by a suitable number of bolts 66, as shown, and each guide 63 is provided with a horizontal extension 67, which rests upon the upper side or surface of the corresponding enlargements 65, and which is secured thereto by one of the bolts 66, above referred to, and also by a screw 68 or an equivalent device. Each pin or bolt 62 is surrounded within the corresponding guide 63 by a spiral spring 69, the outer end of which abuts against an annular shoulder 70, which is formed on the outer end of the guide, and also against a shoulder $7^a$ on the pin. To the outer end of each pin or bolt 62 is pivotally connected one end of a link-bar 71, the opposite or outer end of which is formed with a handle 72, as shown. The outer portion of this handle works longitudinally through a guide-loop 73, which is formed upon one side of the corresponding one of a number of adjusting-levers 74. The opposite end of each of the adjusting-levers 74 is pivotally connected, as at 75, to the upper portion of the corresponding adjustable standard 40, the pivot-bolt 75 passing horizontally through the standard and also through the lower end of a pendent strap 76, the upper end of which is secured, as at 77, to the upper extremity of the standard. At a point about midway of its length each adjusting-lever 74 is formed with a longitudinal slot or loop 78, through which extends a pivot pin or bolt 79, said pin or bolt passing transversely through the upper ends of the arms formed on the upper bifurcated end of a vertical standard 80. Each of the standards 80 is bolted at its lower end, as at 81, (see Fig. 9,) to one side of the oblique bar 33 and rises vertically therefrom. It will thus be seen that by grasping the outer end of one of the levers 74 and drawing the link-bar 71 backward the pin or bolt 62 can be drawn out of one of the openings 61, and the lever 74 can be raised or depressed, so as to raise or depress the corresponding standard 40, and thus set the plowshare 39 so as to cut any desired depth of furrow. After the standard 40 has been so adjusted the link-bar 71 is released and the spring 63 forces the pin 62 into the desired hole or recess 61. This same operation takes place with all of the standards 40, and as the plowshares 39 are thus adjusted the bracket-arms 52 are either raised or lowered, so as to cause the colters 53 to cut the desired depth. Each standard 40 is shown as further supported in its desired position of vertical adjustment by an eye 82, which is of rectangular form to embrace the standard and which lies within the recess 41, above described. From one corner of this eye extends horizontally outward an externally-screw-threaded stem or bolt 83, said stem or bolt passing longitudinally through the recess $42^a$ and also transversely through a wear-plate 85, which is secured to the right-hand side of the oblique bar 33 by a number of horizontal through-bolts 86 and also by the bolts 81 and 36.

87 designates the seed-hopper of the machine, the said hopper extending transversely of the machine-frame at the front end thereof and being supported at its ends by vertical standards 88, the lower ends of which are bolted, as at 89, or otherwise securely fastened to the front ends of the side beams 1 of the machine-frame. The bottom 90 of this hopper is formed with any suitable number of feed-openings 91, and the top 92 of the hopper is attached to the hopper by any suitable or preferred number of hinges 93, said top being thus adapted for use as a cover and being retained in position when closed by a hook 94, as shown. Immediately below the bottom 90 of the hopper 87 is located a plate 95, which extends longitudinally of the hopper, and which is formed with a number of openings 96, corresponding with the openings 91 of the bottom 90. This plate 95 is in turn supported by a second plate 97, which is formed with a number of large openings 98, corresponding with the openings 91 and 96 of the bottom 90 and plate 95, above described. The plate 97 is a stationary plate, while the plate 95 is longitudinally movable in the hopper-bottom, so as to bring the openings 96 more or less out of alignment or register with the openings 91 and 98, and thus vary the area of the feed-openings of the hopper, so as to regulate the quantity of seed fed from the hopper, as desired.

The described movement of the plate 95 is accomplished by a horizontal lever 99, which is pivoted, as at 100, upon a bracket 101, and the front end of which extends through an opening 102 in the rear wall of the hopper 87, while the front extremity of said lever engages a recess 103 in the rear margin of the movable plate 95. This lever 99 extends at its outer or rear end beneath the outer or rear end 104 of the bracket 101, this portion being provided with a segmental slot 105, through which passes the stem of a set-screw 106. The arrangement is such that after the lever 99 has been moved laterally to set the plate 95, as desired, the set-screw 106 is tightened so as to retain the lever and its plate in such position.

107 designates the horizontal feed-shaft of the seeding mechanism, the said shaft extending longitudinally beneath the seed-hopper 87 and having its end portions journaled in bearings 108, which are screwed or bolted to the under side of the hopper-bottom, at the ends thereof, as shown. At intervals between its ends the shaft 107 carries a number of feed-wheels 109, each of which is so mounted upon the shaft as to turn therewith and each of which lies immediately beneath one of the outlet-openings 98 of the hopper. The teeth of each of these feed-wheels extend obliquely or tangentially from the periphery of the wheel, so as to receive the seed and carry it under the shaft from the hopper as the shaft revolves, and thus deposit the seed upon the ground. At one end the shaft 107 carries a sprocket-wheel 110, the hub 111 of which is formed on its inner side with two oppositely-disposed recesses 112, as shown. This sprocket-wheel is embraced by the bifurcated front end 113$^a$ of a lever 113, the ends of the arms of said lever being formed with eyes 114 to receive the end of the shaft. This lever 113 is pivoted, as at 115$^a$, upon the arm 116 of a bracket 117, the body portion of which is bolted or otherwise suitably secured to the under side of the hopper-bottom, the pivot-pin 115 being inserted into the outer one of a number of holes 118 in the bracket and the outer one of a number of holes 115$^a$ in the lever 113, a retaining-pin 115$^b$ being inserted into one of the outer holes 118 and 115$^a$ and holding the lever in its desired position of adjustment. A sprocket-chain 119 runs over a sprocket-wheel 120, which is carried by the inner end of the hub of the left-hand rear carrying wheel 6 and thence forward and over the sprocket-wheel 110. The arrangement is such that by throwing the lever 113 in one direction the recesses 111 of the wheel 110 are caused to engage the ends of a cross-pin 121 of the shaft 107, so that said wheel shall turn the shaft and rotate the feed-wheels 109, and that by throwing the lever 113 in the opposite direction the wheel shall be thrown out of engagement, and thus rotate independently of the shaft 107.

From the above description it will be seen that I have produced a combined gang-plow and seeder which is simple, strong, durable, and comparatively inexpensive in construction and of light draft, and the operations of which are under complete control of the driver or attendant. It is to be observed that while I have shown the machine as provided with both the spring-pressed pins 62 and the eyes 82 for retaining the standards 40 in their several positions of adjustment the eyes alone may be used for such purpose, the pins and their connections being omitted, or that the pins and their connections alone may be used, the eyes being omitted. In either event the standards 40 are preferably provided with graduated scales 122, showing inches and feet, so that the precise depth of cut of the plowshares shall be indicated by the standards.

Having thus described my invention, what I claim as new therein, and desire to secure by Letters Patent, is—

1. A combined plow and seeder comprising a suitable supporting-frame, a number of vertically-movable standards for the plowshares, working through said frame, and graduated scales carried by said standards for indicating the depth of cut of the plowshares, substantially as set forth.

2. A combined gang-plow and seeder comprising a rectangular supporting-frame, a horizontal supporting-beam extending from one front corner of the supporting-frame to the diagonally-opposite rear corner of the same, a number of vertical standards carrying each at its lower end a plowshare and vertically adjustable through said beam, horizontal adjusting-levers pivoted upon said beam, and spring-pressed retaining pins or bolts engaging openings in said standards, and link-bars connecting the pins or bolts with the levers, substantially as set forth.

3. A combined gang-plow and seeder comprising a suitable supporting-frame, a horizontal supporting-beam for the plowshare, standards extending obliquely from front to rear of the frame and provided with recesses for the plow-standards, and a bearing-plate having guides for retaining pins or bolts which support the standards, substantially as set forth.

4. A combined gang-plow and seeder comprising a number of vertically-movable plow-standards carrying each at its lower end a plowshare and a colter-carrying bracket embracing at its rear end the upper part of the plowshare standard and adjustably connected to each standard above the plowshare, substantially as set forth.

In testimony whereof I affix my signature in the presence of two witnesses.

HEINRICH SOMMERFELD.

Witnesses:
JNO. L. CONDRON,
G. Y. THORPE.